(12) United States Patent
Kim

(10) Patent No.: US 8,634,505 B2
(45) Date of Patent: Jan. 21, 2014

(54) METHOD AND APPARATUS FOR CHANNEL AND NOISE ESTIMATION

(75) Inventor: Byoung-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/608,116

(22) Filed: Sep. 10, 2012

(65) Prior Publication Data

US 2013/0003816 A1   Jan. 3, 2013

Related U.S. Application Data

(62) Division of application No. 11/553,296, filed on Oct. 26, 2006, now Pat. No. 8,265,209.

(60) Provisional application No. 60/731,423, filed on Oct. 28, 2005.

(51) Int. Cl.
*H04L 27/06* (2006.01)
*H03D 1/04* (2006.01)

(52) U.S. Cl.
USPC .......................................... 375/340; 375/346

(58) Field of Classification Search
USPC ......... 375/316, 340, 229, 230, 343, 346, 347, 375/348, 349, 350, 259, 267
See application file for complete search history.

(56) References Cited

U.S. PATENT DOCUMENTS

| | | | |
|---|---|---|---|
| 5,379,324 A | 1/1995 | Mueller et al. | |
| 6,028,901 A | 2/2000 | Huynh et al. | |
| 6,115,427 A | 9/2000 | Calderbank et al. | |
| 6,662,024 B2 | 12/2003 | Walton et al. | |
| 7,310,304 B2 | 12/2007 | Mody et al. | |
| 7,386,005 B2 | 6/2008 | Lugil et al. | |

(Continued)

FOREIGN PATENT DOCUMENTS

| | | |
|---|---|---|
| EP | 1542388 A1 | 6/2005 |
| EP | 1727297 | 11/2006 |

(Continued)

OTHER PUBLICATIONS

Benjebbour A, et al., "Accurate noise variance estimation scheme for ordered successive detection in MIMO systems" Information, Communications and Signal Processing, 2003 and Fourth Pacific Rim Conference on Multimedia. Proceedings of the 2003 Joint Conference of the Fourth International Conference on Singapore Dec. 15-18, 2003, Piscataway, NJ, USA,IEEE, vol. 2, Dec. 15, 2003, pp. 1023-1027, XP010702412.

(Continued)

*Primary Examiner* — Sam K Ahn
*Assistant Examiner* — Vineeta Panwalkar
(74) *Attorney, Agent, or Firm* — Charles E. Eggers

(57) ABSTRACT

A technique for performing channel and noise estimation for a MIMO transmission sent from multiple transmit antennas to multiple receive antennas is described. Samples are obtained from multiple receive antennas for a multiple-input multiple-output (MIMO) transmission sent from multiple transmit antennas. Channel estimates are derived by correlating the samples with at least one pilot sequence. Signal, noise and interference statistics are also estimated based on a cross product of the samples. Equalizer weights are derived. The correlating includes multiplying a sample vector for a chip period and a complex conjugated pilot chip for the chip period offset by a delay.

16 Claims, 10 Drawing Sheets

(56) References Cited

U.S. PATENT DOCUMENTS

| | | |
|---|---|---|
| 7,421,009 B2 | 9/2008 | Kawamoto et al. |
| 7,480,270 B2 | 1/2009 | Achour et al. |
| 7,702,045 B2 | 4/2010 | Athanasios et al. |
| 7,830,976 B2 | 11/2010 | Gorokhov et al. |
| 8,265,209 B2 | 9/2012 | Kim |
| 2001/0046221 A1* | 11/2001 | Ostman et al. ............... 370/335 |
| 2002/0181390 A1 | 12/2002 | Mody et al. |
| 2002/0196754 A1 | 12/2002 | Lugil et al. |
| 2003/0016640 A1 | 1/2003 | Onggosanusi et al. |
| 2003/0087673 A1 | 5/2003 | Walton et al. |
| 2003/0142730 A1 | 7/2003 | Lin |
| 2005/0002356 A1 | 1/2005 | Kim et al. |
| 2005/0002445 A1* | 1/2005 | Dunyak et al. ............... 375/148 |
| 2005/0259721 A1 | 11/2005 | Kawamoto et al. |
| 2006/0045194 A1 | 3/2006 | Athanasios et al. |
| 2006/0060372 A1 | 3/2006 | Pabst |
| 2006/0140297 A1* | 6/2006 | Maltsev et al. ............... 375/260 |
| 2007/0018891 A1 | 1/2007 | Golden et al. |

FOREIGN PATENT DOCUMENTS

| | | |
|---|---|---|
| JP | 2002544706 T | 12/2002 |
| WO | WO0069086 A1 | 11/2000 |
| WO | WO0070815 | 11/2000 |
| WO | WO02093784 A1 | 11/2002 |
| WO | WO03030402 A1 | 4/2003 |
| WO | WO2004015946 A1 | 2/2004 |
| WO | WO2005055456 | 6/2005 |
| WO | 2007049547 A1 | 5/2007 |

OTHER PUBLICATIONS

Boumard, S., "Novel noise variance and SNR estimation algorithm for wireless MIMO OFDM systems," Global Telecommunications Conference, 2003. Globecom '03. IEEE vol. 3, Dec. 1-5, 2003 pp. 1330-1334 vol. 3, San Francisco Dec. 1-5, NY USA vol. 7.

Casella I R S, et al., "Equalization pos-combining with channel estimation and mimo joint equalization combining receivers for space-time block coding in frequency selective channels" Personal, Indoor and Mobile Radio Communications, 2003. PIMRC 2003. 14th IEEE Proceedings on Sep. 7-10, 2003, Piscataway, NJ, USA,IEEE, vol. 2, Sep. 7, 2003, pp. 1317-1321, XP010679276.

International Search Report and Written Opinion—PCT/US2006/060372, International Search Authority—European Patent Office—Aug. 17, 2007.

R4-030797, "An Advanced Receiver Proposal for MIMO," TSG-RAN WG4 #28, Lucent Technologies, Sophia-Antipolis, Aug. 18-22, 2003, pp. 1-8.

Van Duc Nguyen, et al., "Estimation of the Channel Impulse Response Length and the Noise Variance for OFDM Systems" Vehicular Technology Conference, 2005. VTC 2005—Spring. 2005 IEEE 61st Stockholm, Sweden Apr. 30-May 1, 2005, Piscataway, NJ, USA, IEEE, May 30, 2005, pp. 429-433, XP010855429.

Xiaodong Xu, et al., "Subspace-based noise variance and SNR estimation for OFDM systems" Wireless Communications and Networking Conference, 2005 I E E E New Orleans, LA, USA Mar. 13-17, 2005, Piscataway, NJ, USA, IEEE, Mar. 13, 2005, pp. 23-26, XP010791149.

* cited by examiner

METHOD AND APPARATUS FOR CHANNEL AND NOISE ESTIMATION

I. RELATED APPLICATIONS

This application is a divisional of U.S. patent application Ser. No. 11/553,296, entitled "METHOD AND APPARATUS FOR CHANNEL AND NOISE ESTIMATION," filed Oct. 26, 2006, which claims priority to Provisional Application No. 60/731,423, entitled "METHOD AND APPARATUS FOR SPACE-TIME EQUALIZATION IN WIRELESS COMMUNICATIONS," filed Oct. 28, 2005, which are both herein incorporated by reference.

BACKGROUND

I. Field

The present disclosure relates generally to communication, and more specifically to techniques for performing channel and noise estimation for a multiple-input multiple-output (MIMO) transmission.

II. Background

A MIMO transmission is a transmission from multiple (T) transmit antennas to multiple (R) receive antennas. For example, a transmitter may simultaneously transmit T data streams from the T transmit antennas. These data streams are distorted by the propagation environment and further degraded by noise. A receiver receives the transmitted data streams via the R receive antennas. The received signal from each receive antenna contains scaled versions of the transmitted data streams, possibly at different delays determined by the propagation environment. The transmitted data streams are thus dispersed among the R received signals from the R receive antennas. The receiver would then perform receiver spatial processing (e.g., space-time equalization) on the R received signals in order to recover the transmitted data streams.

The receiver may derive channel and noise estimates for the MIMO channel and may then derive weights for a space-time equalizer based on the channel and noise estimates. The quality of the channel and noise estimates may have a large impact on performance. There is therefore a need in the art for techniques to derive quality channel and noise estimates for a MIMO transmission.

SUMMARY

According to an embodiment of the invention, an apparatus is described which includes at least one processor and a memory. The processor(s) obtain samples from multiple receive antennas for a MIMO transmission sent from multiple transmit antennas, derive channel estimates by correlating the samples with at least one pilot sequence, and estimate signal, noise and interference statistics based on the samples. The MIMO transmission may comprise multiple modulated signals sent from the multiple transmit antennas. Each modulated signal may comprise multiple data streams multiplexed with different orthogonal codes.

According to another embodiment, an apparatus is described which includes at least one processor and a memory. The processor(s) obtain samples from multiple receive antennas for a MIMO transmission sent from multiple transmit antennas, estimate total received energy based on the samples, estimate signal and interference energy based on the samples, and estimate noise based on the estimated total received energy and the estimated signal and interference energy.

According to yet another embodiment, an apparatus is described which includes at least one processor and a memory. The processor(s) obtain samples from multiple receive antennas for a MIMO transmission sent from multiple transmit antennas, estimate signal and on-time interference statistics based on the samples, estimate noise and multipath interference statistics based on the samples, and estimate signal, noise and interference statistics based on the estimated signal and on-time interference statistics and the estimated noise and multipath interference statistics. The on-time interference is interference that arrives at the same time as a desired signal, and the multipath interference is interference that is not on time.

According to yet another embodiment, an apparatus is described which includes at least one processor and a memory. The processor(s) obtain samples from multiple receive antennas for a MIMO transmission sent from multiple transmit antennas, determine the channel conditions based on the samples, select one of multiple channel and noise estimation schemes based on the channel conditions, and perform channel and noise estimation based on the selected channel and noise estimation scheme. To determine the channel conditions, the processor(s) may process the samples to determine delay spread, to identify single path or multipath environment, and so on.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The channel and noise estimation techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and so on. A CDMA system may implement one or more radio technologies such as Wideband-CDMA (W-CDMA), cdma2000, and so on. cdma2000 covers IS-2000, IS-856, and IS-95 standards. A TDMA system may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. An OFDMA system transmits modulation symbols in the frequency domain on orthogonal frequency subcarriers using orthogonal frequency division multiplexing (OFDM). An SC-FDMA system transmits modulation symbols in the time domain on orthogonal frequency subcarriers. For clarity, these techniques are described below for a MIMO transmission sent in a CDMA system, which may implement W-CDMA and/or cdma2000.

Figure 1:
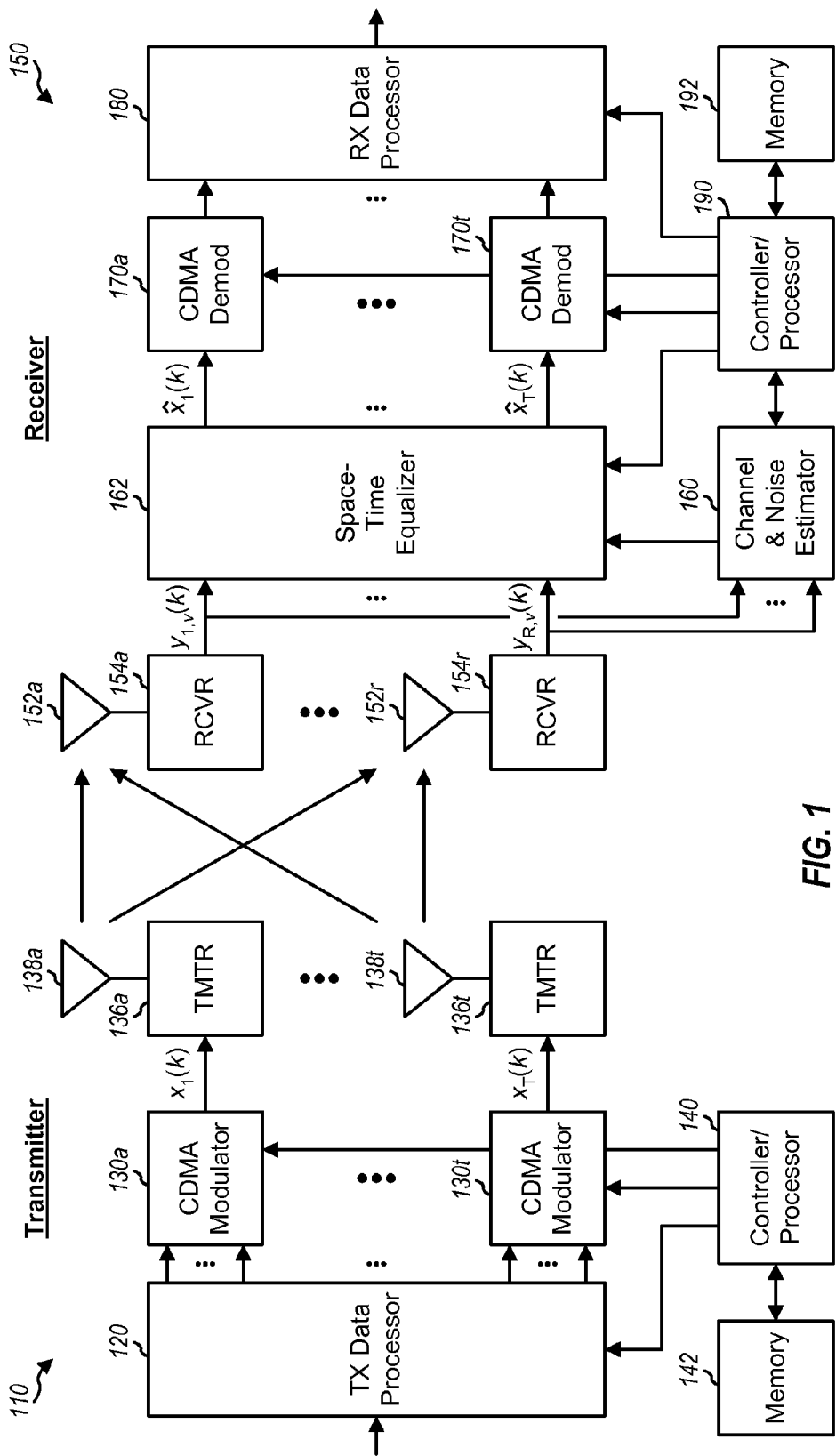
FIG. 1 shows a transmitter and a receiver for a MIMO transmission.

FIG. 1 shows a block diagram of a transmitter 110 and a receiver 150 for a MIMO transmission. For a downlink/forward link transmission, transmitter 110 is part of a base station, and receiver 150 is part of a wireless device. For an uplink/reverse link transmission, transmitter 110 is part of a wireless device, and receiver 150 is part of a base station. A base station is typically a fixed station that communicates with the wireless devices and may also be called a Node B, an access point, and so on. A wireless device may be fixed or mobile and may also be called a user equipment (UE), a mobile station, a user terminal, a subscriber unit, and so on. A wireless device may be a cellular phone, a personal digital assistant (PDA), a wireless modem card, or some other device or apparatus.

At transmitter 110, a transmit (TX) data processor 120 processes (e.g., encodes, interleaves, and symbol maps) traffic data and provides data symbols to multiple (T) CDMA modulators 130a through 130t. As used herein, a data symbol is a modulation symbol for data, a pilot symbol is a modulation symbol for pilot, a modulation symbol is a complex value for a point in a signal constellation (e.g., for M-PSK or M-QAM), and pilot is data that is known a priori by both the transmitter and receiver. Each CDMA modulator 130 processes its data symbols and pilot symbols as described below and provides output chips to an associated transmitter unit (TMTR) 136. Each transmitter unit 136 processes (e.g., converts to analog, amplifies, filters, and frequency upconverts) its output chips and generates a modulated signal. T modulated signals from T transmitter units 136a through 136t are transmitted from T antennas 138a through 138t, respectively.

At receiver 150, multiple (R) antennas 152a through 152r receive the transmitted signals via various signal paths and provide R received signals to R receiver units (RCVR) 154a through 154r, respectively. Each receiver unit 154 processes (e.g., filters, amplifies, frequency downconverts, and digitizes) its received signal and provides samples to a channel and noise estimator 160 and a space-time equalizer 162. Estimator 160 derives channel and noise estimates based on the samples, as described below. Space-time equalizer 162 derives weights based on the channel and noise estimates, performs equalization on the samples with the weights, and provides data chip estimates to T CDMA demodulators (Demod) 170a through 170t. Each CDMA demodulator 170 processes its data chip estimates in a manner complementary to the processing by CDMA modulator 130 and provides data symbol estimates. A receive (RX) data processor 180 processes (e.g., symbol demaps, deinterleaves, and decodes) the data symbol estimates and provides decoded data. In general, the processing by CDMA demodulator 170 and RX data processor 180 is complementary to the processing by CDMA modulator 130 and TX data processor 120, respectively, at transmitter 110.

Controllers/processors 140 and 190 direct operation of various processing units at transmitter 110 and receiver 150, respectively. Memories 142 and 192 store data and program codes for transmitter 110 and receiver 150, respectively.

Figure 2:
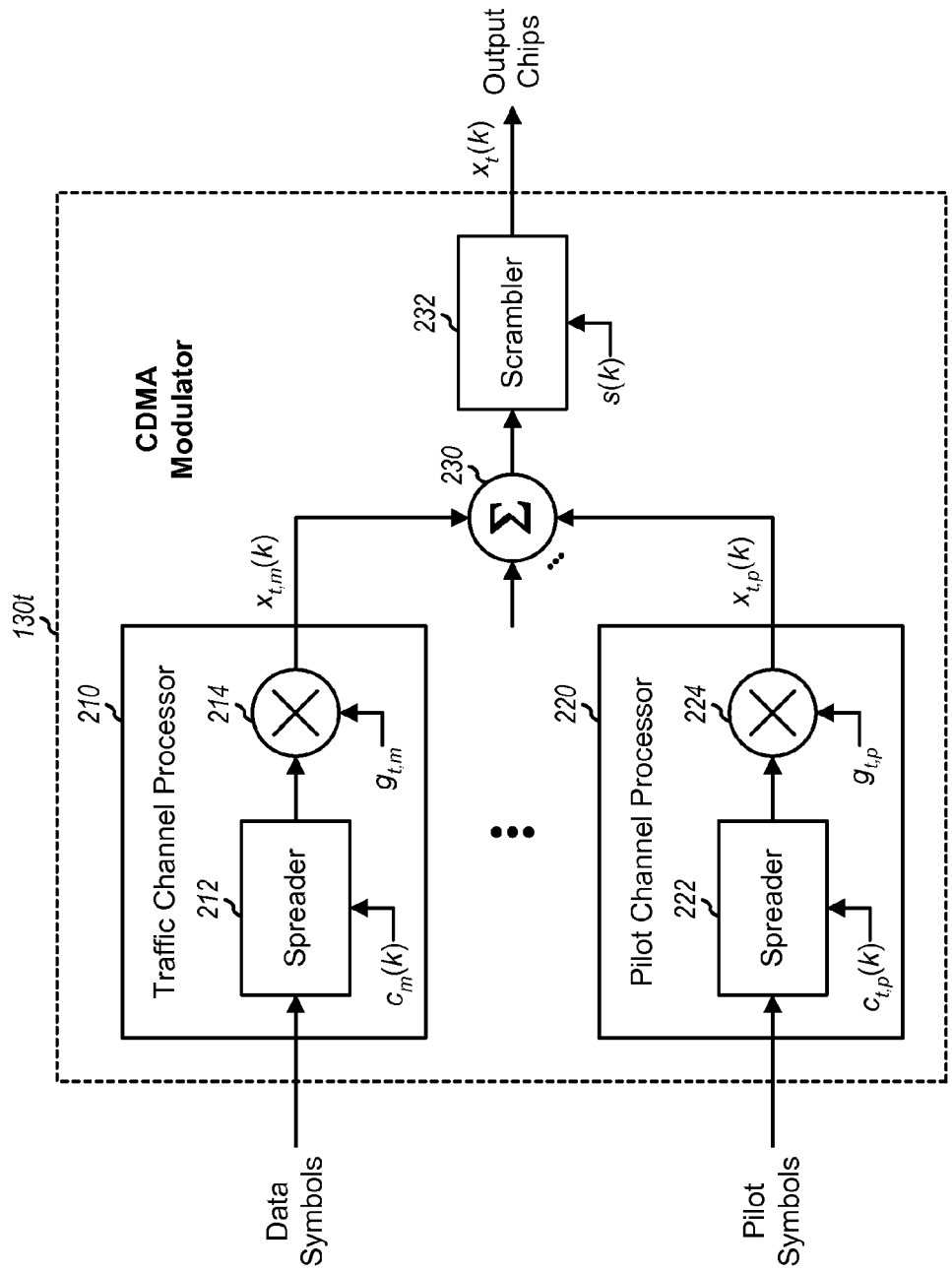
FIG. 2 shows a CDMA modulator for one transmit antenna.

FIG. 2 shows a block diagram of a CDMA modulator 130 for one transmit antenna. CDMA modulator 130 may be used for each of CDMA modulators 130a through 130t in FIG. 1. CDMA modulator 130 includes a traffic channel processor 210 for each traffic channel used for traffic data and a pilot channel processor 220 for pilot. Within processor 210 for traffic channel m, a spreader 212 spreads data symbols with an orthogonal code $c_m(k)$ for traffic channel m. A multiplier 214 scales the output of spreader 212 with a gain $g_{t,m}$ and provides data chips $x_{t,m}(k)$ for traffic channel m on transmit antenna t. Within pilot channel processor 220, a spreader 222 spreads pilot symbols with an orthogonal code $c_{t,p}(k)$ for pilot. A multiplier 224 scales the output of spreader 222 with a gain $g_{t,p}$ and provides pilot chips $x_{t,p}(k)$ for the pilot channel on transmit antenna t. A summer 230 sums the chips for all traffic and pilot channels. A scrambler 232 multiplies the output of summer 230 with a scrambling sequence s(k) for transmitter 110 and provides output chips $x_t(k)$ for transmit antenna t.

The orthogonal codes for the traffic and pilot channels may be orthogonal variable spreading factor (OVSF) codes used in W-CDMA, Walsh codes used in cdma2000, and so on. In an embodiment, T different orthogonal codes are used for the pilot for the T transmit antennas to allow receiver 150 to estimate the channel response for each transmit antenna. The remaining orthogonal codes may be used for each of the T transmit antennas. For this embodiment, the pilot orthogonal codes for the T transmit antennas are distinct whereas the traffic orthogonal codes may be reused for the T transmit antennas. The spreading and scrambling may also be performed in other manners than the manner shown in FIG. 2.

The output chips for each transmit antenna t may be expressed as:

$$\underline{x}_t(k) = \sigma_x \cdot [x_t(k)\,x_t(k+1)\ldots x_t(k+K-1)]^T, \qquad \text{Eq (1)}$$

where $\underline{x}_t(k)$ is a K×1 vector with K output chips sent from transmit antenna t, $x_t(k)$ is the output chip sent in chip period k from transmit antenna t, $\sigma_x$ is the gain for the output chips, and "$T$" denotes a transpose.

K may be set as K=E+L−1, where E is the span of space-time equalizer 162 at receiver 150 and L is the delay spread of the MIMO channel between transmitter 110 and receiver 150. Vector $\underline{x}_t(k)$ would then contain E+L−1 chips to be operated on by the space-time equalizer at the receiver.

In an embodiment, the receiver digitizes the received signal from each receive antenna at V times the chip rate for an oversampling factor of V and obtains V samples for each chip period. The samples for each receive antenna r may be expressed as:

$$\underline{y}_r(k) = [y_{r,1}(k)\ldots y_{r,V}(k)\ldots y_{r,1}(k+E-1)\ldots y_{r,V}(k+E-1)]^T, \qquad \text{Eq (2)}$$

where $\underline{y}_r(k)$ is a V·E×1 vector of samples for receive antenna r, and $y_{r,v}(k)$ is the v-th sample in chip period k for receive antenna r.

The noise observed by the samples in $\underline{y}_r(k)$ may be expressed as:

$$\underline{n}_r(k) = [n_{r,1}(k) \ldots n_{r,V}(k) \ldots n_{r,1}(k+E-1) \ldots n_{r,V}(k+E-1)]^T, \qquad \text{Eq (3)}$$

where $\underline{n}_r(k)$ is a V·E×1 noise vector for receive antenna r, and $n_{r,v}(k)$ is the noise observed by $y_{r,v}(k)$.

$\underline{n}_r(k)$ includes channel noise, receiver noise, and interference from other transmitters, which are collectively referred to as "background" noise. As used herein, the term "noise" may refer to just background noise or background noise and inter-stream interference from other transmit antennas. For example, channel and noise estimation may refer to channel estimation and either background noise estimation or background noise and interference estimation.

The samples for all R receive antennas may be expressed as:

$$\begin{bmatrix} \underline{y}_1(k) \\ \vdots \\ \underline{y}_R(k) \end{bmatrix} = \begin{bmatrix} \underline{H}_{1,1} & \cdots & \underline{H}_{1,T} \\ \vdots & \ddots & \vdots \\ \underline{H}_{R,1} & \cdots & \underline{H}_{R,T} \end{bmatrix} \cdot \begin{bmatrix} \underline{x}_1(k) \\ \vdots \\ \underline{x}_T(k) \end{bmatrix} + \begin{bmatrix} \underline{n}_1(k) \\ \vdots \\ \underline{n}_R(k) \end{bmatrix}, \qquad \text{Eq (4)}$$

where $\underline{H}_{r,t}$ is a V·E×K multipath channel matrix between transmit antenna t and receive antenna r. $\underline{H}_{r,t}$ may be given as:

$$\underline{H}_{r,t} \equiv \begin{bmatrix} h_{r,t,1}(L-1) & \cdots & h_{r,t,1}(0) & & \\ \vdots & \ddots & \vdots & & \\ h_{r,t,V}(L-1) & \cdots & h_{r,t,V}(0) & & \\ & \ddots & & \ddots & \\ & & h_{r,t,1}(L-1) & \cdots & h_{r,t,1}(0) \\ & & \vdots & \ddots & \vdots \\ & & h_{r,t,V}(L-1) & \cdots & h_{r,t,V}(0) \end{bmatrix}, \qquad \text{Eq (5)}$$

where $h_{r,t,v}(l)$ is a complex channel gain between transmit antenna t and receive antenna r for the l-th channel tap at the v-th sampling time instant.

The impulse response between transmit antenna t and receive antenna r has a length of L chips and may be over-sampled at V times chip rate to obtain V·L channel gains. These V·L channel gains may be arranged into V rows such that each row contains L channel gains for one sampling time instant v. Sample $y_{r,v}(k)$ for sampling time instant v is obtained by convolving the transmitted data chips in $\underline{x}_t(k)$ with a row of channel gains for that sampling time instant. $\underline{H}_{r,t}$ contains V·E rows for the V·E samples in $\underline{y}_r(k)$. Each row of $\underline{H}_{r,t}$ represents the channel impulse response for one sample in $\underline{y}_r(k)$.

Equation (4) may be rewritten as follows:

$$\underline{y}(n) = \underline{H} \cdot \underline{x}(k) + \underline{n}(k), \qquad \text{Eq (6)}$$

where $\underline{y}(k) = [\underline{y}_1^T(k)\ \underline{y}_2^T(k) \ldots \underline{y}_R^T(k)]^T$ is an R·V·E×1 overall received sample vector for all R receive antennas, $\underline{x}(k) = [\underline{x}_1^T(k)\ \underline{x}_2^T(k) \ldots \underline{x}_T^T(k)]^T$ is a T·K×1 overall transmitted chip vector for all T transmit antennas, $\underline{n}(k) = [\underline{n}_1^T(k)\ \underline{n}_2^T(k) \ldots \underline{n}_R^T(k)]^T$ is an R·V·E×1 overall noise vector for all R receive antennas, and $\underline{H}$ is an R·V·E×T·K overall channel response matrix.

The overall channel response matrix $\underline{H}$ may be given as:

$$\underline{H} \equiv [\underline{h}_1\ \underline{h}_2\ \cdots\ \underline{h}_{T\cdot K}] \equiv \begin{bmatrix} \underline{H}_{1,1} & \cdots & \underline{H}_{1,T} \\ \vdots & \ddots & \vdots \\ \underline{H}_{R,1} & \cdots & \underline{H}_{R,T} \end{bmatrix}. \qquad \text{Eq (7)}$$

The first K columns of $\underline{H}$ are for transmit antenna 1, the next K columns of $\underline{H}$ are for transmit antenna 2, and so on, and the last K columns of $\underline{H}$ are for transmit antenna T. Each column of $\underline{H}$ is denoted as $\underline{h}_i$ and contains the channel gains observed by one transmitted chip $x_t(k)$.

The transmitted chips may be recovered by space-time equalizer 162, as follows:

$$\hat{x}_t(k+D) = \underline{w}_t^H \cdot \underline{y}(k), \qquad \text{Eq (8)}$$

where $\underline{w}_t$ is an R·V·E×1 equalizer weight vector for transmit antenna t, $\hat{x}_t(k+D)$ is an estimate of data chip $x_t(k+D)$ sent from transmit antenna t, and "H" denotes a conjugate transpose.

For each chip period k, vector $\underline{y}(k)$ contains samples for all R receive antennas for the E most recent chip periods. These samples contain components of K=E+L−1 most recent data chips sent from each transmit antenna. Vector $\underline{y}(k)$ is multiplied with $\underline{w}_t^H$ to obtain an estimate of one data chip from one transmit antenna. T weight vectors $\underline{w}_1$ through $\underline{w}_T$ may be formed for the T transmit antennas and used to obtain estimates of T data chips sent from the T transmit antennas in one chip period.

In equation (8), D denotes the delay of the space-time equalizer. For each chip period k, the space-time equalizer provides an estimate of data chip $x_t(k+D)$ sent D chip periods later, instead of an estimate of data chip $x_t(k)$ sent in the k-th chip period. D is determined by the design of the equalizer and, in general, $1 \leq D \leq (E+L-1)$.

The weight vectors $\underline{w}_t$ for the space-time equalizer may be derived based on various receiver processing techniques such as a minimum mean square error (MMSE) technique, a zero-forcing (ZF) technique, a maximal ratio combining (MRC) technique, and so on. Weight matrices may be derived based on the MMSE, ZF, and MRC techniques, as follows:

$$\underline{W}_{mmse}^H = \sigma_x \cdot \underline{H}^H \cdot [\sigma_x^2 \cdot \underline{H} \cdot \underline{H}^H + \underline{R}_n]^{-1}, \qquad \text{Eq (9)}$$

$$\underline{W}_{zf}^H = \sigma_x \cdot \underline{H}^H \cdot [\sigma_x^2 \cdot \underline{H} \cdot \underline{H}^H]^{-1}, \text{ and} \qquad \text{Eq (10)}$$

$$\underline{W}_{mrc}^H = \sigma_x \cdot \underline{H}^H, \qquad \text{Eq (11)}$$

where $\underline{R}_n$ is a noise covariance matrix and $\underline{W}_{mmse}^H$, $\underline{W}_{zf}^H$ and $\underline{W}_{mrc}^H$ are T·K×R·V·E weight matrices for the MMSE, ZF and MRC techniques, respectively. The weight vectors $\underline{w}_t^H$ may be obtained from the rows of $\underline{W}_{mmse}^H$, $\underline{W}_{zf}^H$ and $\underline{W}_{mrc}^H$.

The noise covariance matrix $\underline{R}_n$ may be expressed as:

$$\underline{R}_n = E\{\underline{n}(k) \cdot \underline{n}^H(k)\}, \qquad \text{Eq (12)}$$

where E{ } denotes an expectation operation. $\underline{R}_n$ is indicative of the background noise statistics and has a dimension of R·V·E×R·V·E.

The channel and noise estimation techniques described herein may be used with various receiver processing techniques. For clarity, the following description is for the MMSE technique.

For the MMSE technique, the weight vectors $\underline{w}_t$, for t=1, ..., T, may be expressed as:

$$\underline{w}_t^H = \sigma_x \cdot \underline{h}_{t,D}^H \cdot \underline{R}_{yy}^{-1} \quad \text{Eq (13)}$$

$$= \sigma_x \cdot \underline{h}_{t,D}^H \cdot [\sigma_x^2 \cdot \underline{H} \cdot \underline{H}^H + \underline{R}_n]^{-1}$$

$$= \sigma_x \cdot \underline{h}_{t,D}^H \cdot \left[ \sum_{i=1}^{T \cdot K} \sigma_x^2 \cdot \underline{h}_i \cdot \underline{h}_i^H + \underline{R}_n \right]^{-1}$$

$$= \left( \frac{1}{1 + \sigma_x^2 \cdot \underline{h}_{t,D}^H \cdot \left[ \sum_{i \in I} \sigma_x^2 \cdot \underline{h}_i \cdot \underline{h}_i^H + \underline{R}_n \right]^{-1} \cdot \underline{h}_{t,D}} \right) \cdot$$

$$\sigma_x \cdot \underline{h}_{t,D}^H \cdot \left[ \sum_{i \in I} \sigma_x^2 \cdot \underline{h}_i \cdot \underline{h}_i^H + \underline{R}_n \right]^{-1}$$

where $\underline{h}_{t,D} = \underline{h}_{(t-1) \cdot K+D}$ is a channel response vector for transmit antenna t at delay D, $\underline{R}_{yy}$ is a matrix indicative of the signal, noise and interference statistics, and I is a set that includes 1 through T·K but excludes (t−1)·K+D.

As shown in equation (13), $\underline{R}_{yy}$ includes $\underline{H} \cdot \underline{H}^H$ and $\underline{R}_n$. $\underline{H} \cdot \underline{H}^H$ includes the desired signal as well as interference from other transmit antennas. $\underline{R}_n$ includes the background noise. Hence, $\underline{R}_{yy}$ includes the desired signal, the background noise, and the interference from other transmit antennas. For the last equality in equation (13), each summation is over the outer products of all columns of H except for the column for the desired signal, which is $\underline{h}_{t,D}$. $\underline{h}_{t,D}$ includes on-time components arriving at the receiver at delay D. These on-time components include (1) on-time signal component from the desired transmit antenna t and (2) on-time inter-stream interference from the other T−1 transmit antennas also arriving at delay D. Equation (13) minimizes $E\{|\underline{w}_t^H \cdot \underline{y}(k) - x_t(k+D)|^2\}$, which is the mean square error between the transmitted data chip $x_t(k+D)$ and its estimate $\underline{w}_t^H \cdot \underline{y}(k)$.

Enhanced weight vectors $\underline{\tilde{w}}_t$ that take into account the despreading effect of the subsequent CDMA demodulator may be expressed as:

$$\underline{\tilde{w}}_t^H = G \cdot \sigma_x \cdot \underline{h}_{t,D}^H \cdot \left[ \sum_{i=1}^{T} G^2 \cdot \sigma_x^2 \cdot \underline{h}_{i,D} \cdot \underline{h}_{i,D}^H + \sum_{q \in Q} \sigma_x^2 \cdot \underline{h}_q \cdot \underline{h}_q^H + \underline{R}_n \right]^{-1}, \quad \text{Eq (14)}$$

$$= \left( \frac{1}{1 + G^2 \cdot \sigma_x^2 \cdot \underline{h}_{t,D}^H \cdot} \right) \times$$

$$\left[ \sum_{i \in I_t} G^2 \cdot \sigma_x^2 \cdot \underline{h}_{i,D} \cdot \underline{h}_{i,D}^H + \sum_{q \in Q} \sigma_x^2 \cdot \underline{h}_q \cdot \underline{h}_q^H + \underline{R}_n \right]^{-1} \cdot \underline{h}_{t,D}$$

$$G \cdot \sigma_x \cdot \underline{h}_{t,D}^H \cdot \left[ \sum_{i \in I_t} G^2 \cdot \sigma_x^2 \cdot \underline{h}_{i,D} \cdot \underline{h}_{i,D}^H + \sum_{q \in Q} \sigma_x^2 \cdot \underline{h}_q \cdot \underline{h}_q^H + \underline{R}_n \right]^{-1},$$

where G is a gain for a traffic channel being received from transmit antenna t, $I_t$ is a set that includes 1 through T but excludes t, and Q is a set that includes 1 through T·K but excludes (i−1)·K+D, for i=1, ..., T.

For simplicity, equation (14) assumes the use of the same gain G for all transmit antennas and all traffic channels/orthogonal codes/streams. If J orthogonal codes are used for each transmit antenna and if each orthogonal code has a length of SF, then gain G may be given as $G = \sqrt{SF/J}$. In general, different gains may be used for different orthogonal codes and/or different transmit antennas.

As shown in equations (13) and (14), the MMSE weight vectors may be derived based on the channel response vectors $\underline{h}_1$ through $\underline{h}_{T \cdot K}$ and the noise covariance matrix $\underline{R}_n$. The channel response vectors may be derived based on a pilot, which may be transmitted using code division multiplexing (CDM), time division multiplexing (TDM), frequency division multiplexing (FDM), and so on. For clarity, the following description assumes the use of a CDM pilot transmitted as shown in FIG. 2. The channel response vectors and the noise covariance matrix may be estimated directly or indirectly with various schemes, as described below.

In a first channel and noise estimation scheme, the channel and noise estimates are derived directly from the received samples. For this scheme, the channel response vectors may be estimated as follows:

$$\hat{\underline{h}}_{t,D} = LPF_{channel} \left( \frac{1}{N_P \cdot \sqrt{E_{cp}/\sigma_x^2}} \cdot \sum_{k=-D}^{N_P-D-1} p_t^*(k+D) \cdot \underline{y}(k) \right), \quad \text{Eq (15)}$$

where $p_t(k)$ is a pilot chip sent in chip period k from transmit antenna t, $N_P$ is the length of the orthogonal code for the pilot, $E_{cp}$ is the energy per pilot chip, $LPF_{channel}$ denotes an averaging operation for the channel estimate, and $\hat{\underline{h}}_{t,D}$ is an estimate of $\sigma_x \cdot \underline{h}_{t,D}$.

The pilot chips for transmit antenna t may be given as:

$$p_t(k) = d(j) \cdot c_{t,p}(k) \cdot s(k), \quad \text{Eq (16)}$$

where d(j) is a pilot symbol sent in pilot symbol period j, $c_{t,p}(k)$ is the orthogonal code for the pilot for transmit antenna t, and s(k) is the scrambling code for the transmitter.

In equation (15), the overall sample vector $\underline{y}(k)$ is multiplied with the complex conjugated pilot chip $p_t^*(k+D)$ for delay D and accumulated over the length of the pilot orthogonal code to obtain an initial estimate of $\underline{h}_o$. The initial estimate may be filtered over multiple pilot symbols to obtain $\hat{\underline{h}}_{t,D}$, which is an improved estimate of $\underline{h}_{t,D}$. The filtering may be performed based on a finite impulse response (FIR) filter, an infinite impulse response (IIR) filter, and so on. For example, a single-tap IIR filter with a time constant of 0.33, 0.2, or some other value per slot may be used for the channel filter, $LPF_{channel}$. For W-CDMA, each slot spans 2560 chips and covers 10 pilot symbols sent with a 256-chip OVSF code. For cdma2000, each slot spans 768 chips and may cover 12 pilot symbols sent with a 64-chip Walsh code.

The signal, noise and interference statistics may be estimated as follows:

$$\hat{\underline{R}} = LPF_{noise}(\underline{y}(k) \cdot \underline{y}^H(k)), \quad \text{Eq (17)}$$

where $LPF_{noise}$ denotes an averaging operation for $\underline{R}_{yy}$, and $\hat{\underline{R}}_{yy}$ is an estimate of $\underline{R}_{yy}$.

The noise filter, $LPF_{noise}$, may be the same or different from the channel filter, $LPF_{channel}$.

The weight vectors may then be derived as follows:

$$\hat{\underline{w}}_t^H = \hat{\underline{h}}_{t,D}^H \cdot \hat{\underline{R}}_{yy}^{-1}. \quad \text{Eq (18)}$$

Equation (18) is equivalent to equation (13) if $\hat{\underline{h}}_{t,D}$ and $\hat{\underline{R}}_{yy}$ are accurate estimates of $\sigma_x \cdot \underline{h}_{t,D}$ and $\underline{R}_{yy}$, respectively. The SNR of the data chip estimates from the space-time equalizer may be expressed as:

$$SNR_t = \frac{\hat{w}_t^H \cdot \hat{h}_{t,D}}{1 - \hat{w}_t^H \cdot \hat{h}_{t,D}}.$$ Eq (19)

The first scheme derives a single estimate for $\underline{R}_{yy}$. This estimate, $\underline{R}_{yy}$, includes components for both summations in the first equality for equation (14). The two components are not accessible to apply the gain G for the desired traffic channel, and the enhanced weight vectors $\tilde{w}_t$ are not derived from $\hat{\underline{R}}_{yy}$.

Figure 3:
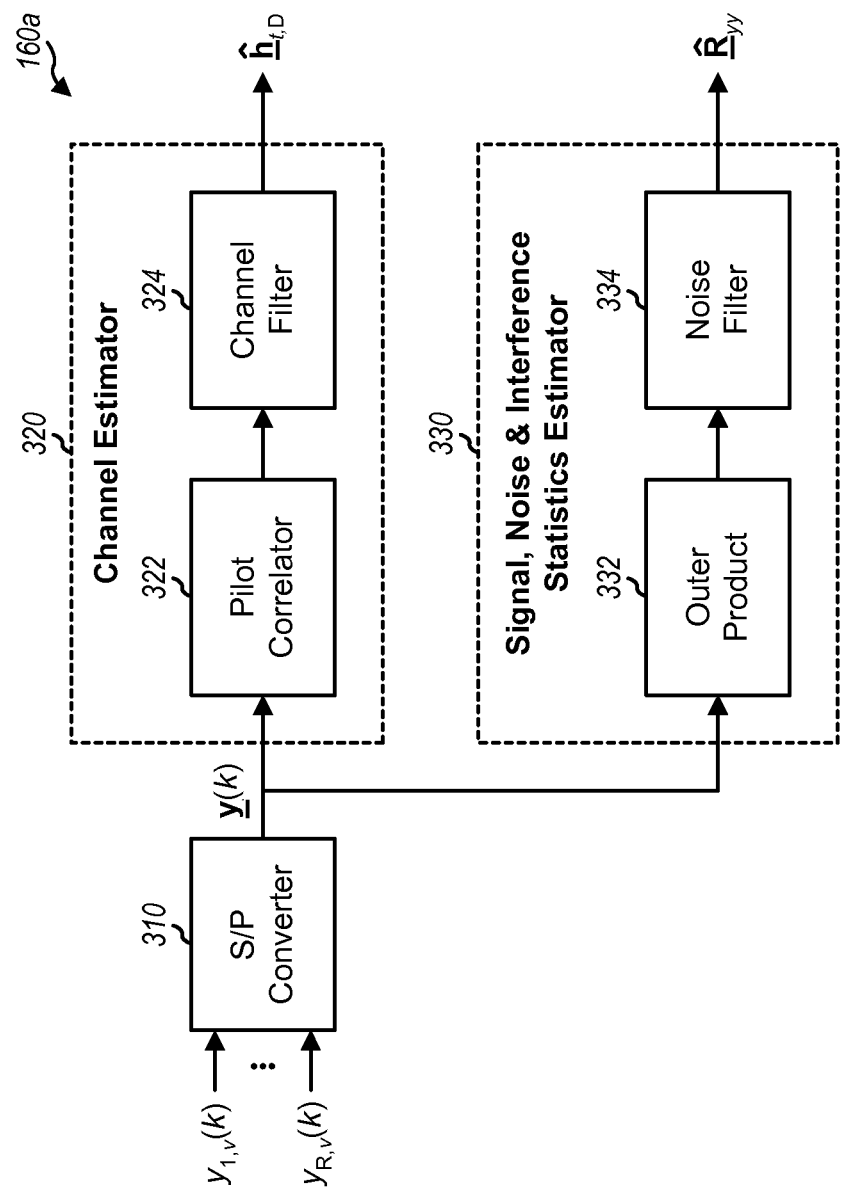
FIG. 3 shows a channel and noise estimator for a first scheme.

FIG. 3 shows a block diagram of a channel and noise estimator 160a, which implements the first channel and noise estimation scheme and is an embodiment of channel and noise estimator 160 in FIG. 1. Estimator 160a includes a serial-to-parallel (S/P) converter 310, a channel estimator 320, and a signal, noise and interference statistics estimator 330. S/P converter 310 receives the samples from R receiver units 154a through 154r and forms vector $\underline{y}(k)$.

Within channel estimator 320, a pilot correlator 322 correlates $\underline{y}(k)$ with a pilot sequence $p_t(k)$ for each transmit antenna t and provides initial channel estimates for all transmit antennas. A channel filter 324 filters the initial channel estimates and provides final channel estimates, $\hat{h}_{t,D}$. Pilot correlator 322 and filter 324 perform processing for equation (15). Within estimator 330, a unit 332 computes the outer product of $\underline{y}(k)$. A noise filter 334 then filters the output of unit 332 and provides the estimated signal, noise and interference statistics, $\hat{\underline{R}}_{yy}$. Unit 332 and filter 334 perform processing for equation (17). The scaling factor in equation (15) may be accounted for in various units, e.g., in filter 324.

Figure 4:
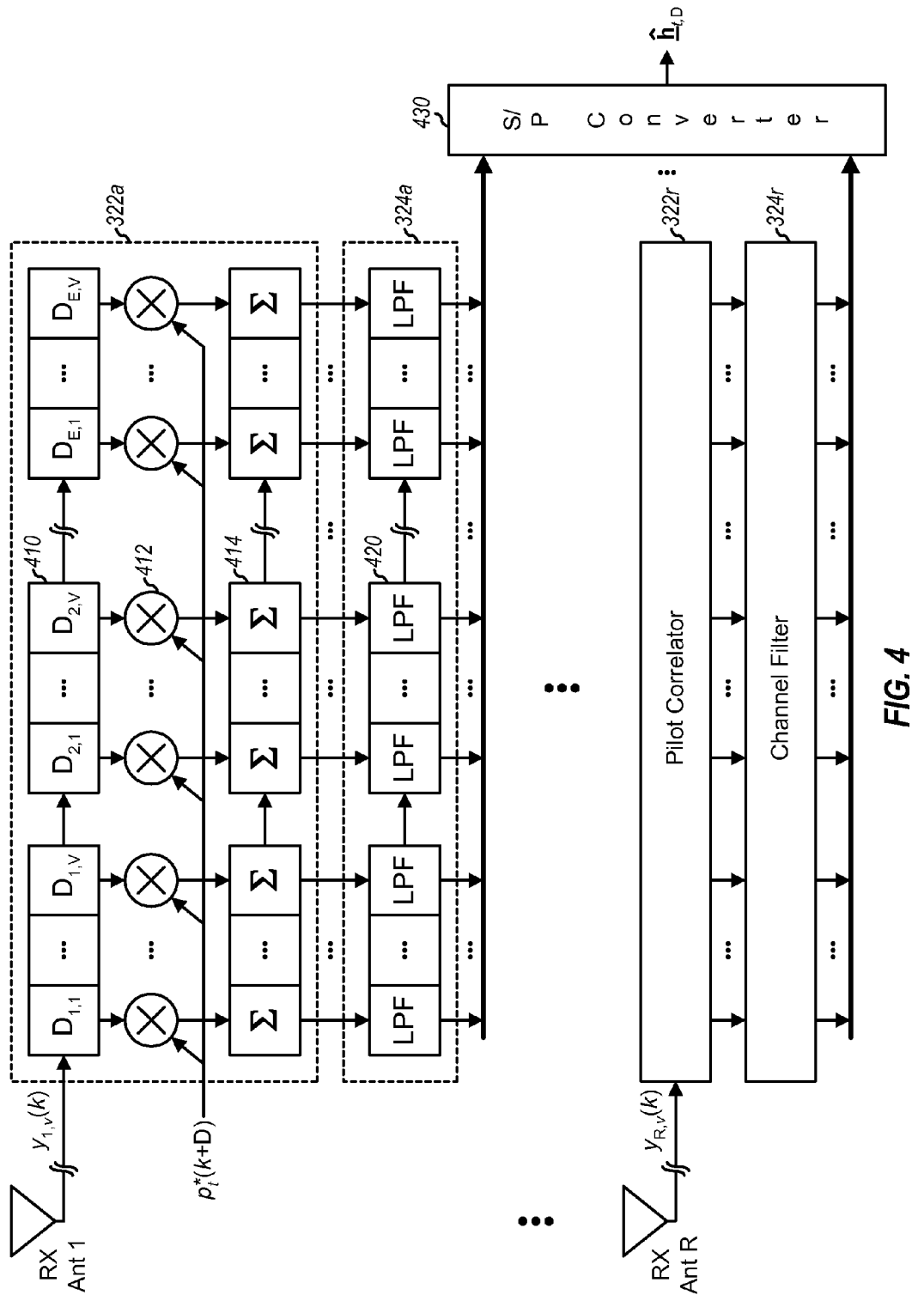
FIG. 4 shows a channel estimator.

FIG. 4 shows an embodiment of channel estimator 320 in FIG. 3. For this embodiment, pilot correlator 322 in FIG. 3 is implemented with R pilot correlators 322a through 322r and channel filter 324 is implemented with R channel filters 324a through 324r. One set of pilot correlator 322r and channel filter 324r is provided for each receive antenna.

The samples $y_{1,v}(k)$ through $y_{R,v}(k)$ from the R receive antennas are provided to R pilot correlators 322a through 322r, respectively. Within each pilot correlator 322r, the samples $y_{r,v}(k)$ are provided to V·E delay elements 410 that are coupled in series. Each delay element 410 provides a delay of one sample period. The V·E delay elements 410 provide their delayed samples to V·E multipliers 412. Each multiplier 412 multiplies its delayed sample with the complex conjugated pilot chip $p_t^*(k+D)$ for delay D. V·E accumulators 414 couple to the V·E multipliers 412. Each accumulator 414 accumulates the output of an associated multiplier 412 over the length of the pilot orthogonal code, or $N_p$ chips, and provides an initial channel gain estimate $h_{t,r,v}'(l)$ for each pilot symbol period.

Within each channel filter 324r, V·E channel filters (LPFs) 420 couple to the V·E accumulators 414 in an associated pilot correlator 322r. Each filter 420 filters the initial channel gain estimates from an associated accumulator 414 and provides a final channel gain estimate $\hat{h}_{t,r,v}(l)$ for each update interval, e.g., each pilot symbol period. An S/P converter 430 receives the final channel gain estimates from filters 420 for all R receive antennas and provides a channel response vector $\hat{\underline{h}}_{t,D}$ for each update interval.

In general, the processing units shown in FIGS. 3 and 4 may be implemented in various manners. For example, these units may be implemented with dedicated hardware, a shared digital signal processor (DSP), and so on.

Figure 5:
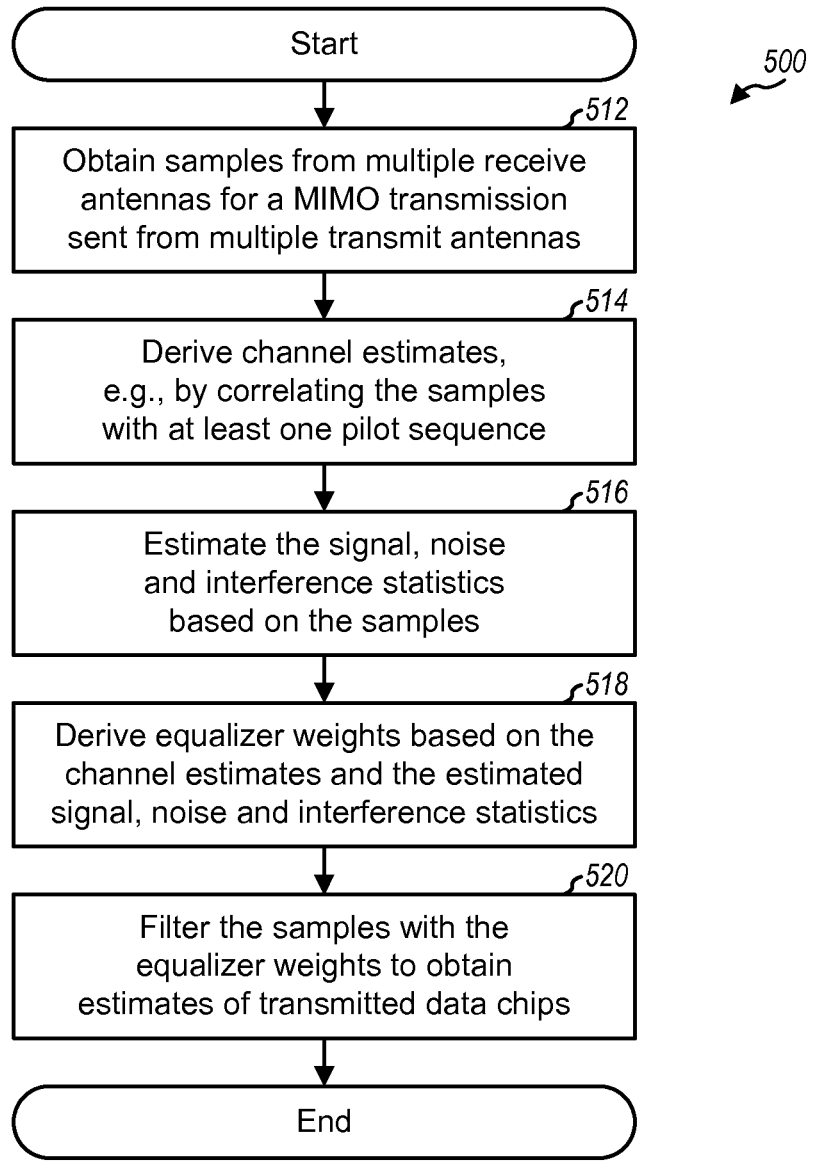
FIG. 5 shows a process for the first channel and noise estimation scheme.

FIG. 5 shows an embodiment of a process 500 for performing channel and noise estimation based on the first scheme. Samples are obtained from multiple receive antennas for a MIMO transmission sent from multiple transmit antennas (block 512). Channel estimates are derived, e.g., by correlating the samples with at least one pilot sequence (block 514). The channel estimates may comprise T channel response vectors $\hat{\underline{h}}_{t,D}$ for t=1, . . . , T, for T transmit antennas at delay D. The channel response vector for each transmit antenna may be obtained based on a pilot sequence for that transmit antenna. The signal, noise and interference statistics are estimated based on the samples, e.g., by computing cross product of the samples and filtering the cross product results (block 516). The channel estimates may be derived with a first filter having a first bandwidth. The estimated signal, noise, and interference statistics may be derived with a second filter having a second bandwidth. The first and second filter bandwidths may be the same or different and may be fixed or configurable, e.g., adjusted based on channel conditions. Equalizer weights are derived based on the channel estimates and the estimated signal, noise and interference statistics (block 518). The samples are filtered with the equalizer weights to obtain estimates of the data chips sent from the transmit antennas (block 520).

In a second channel and noise estimation scheme, the noise estimation is performed based on an estimate of the total received energy, $I_o$, at the receiver and an estimate of the signal and interference energy, $I_{or}$. The terms "energy" and "power" are often used interchangeably.

For the second scheme, the elements of vectors $\sigma_x \cdot \underline{h}_1$ through $\sigma_x \cdot \underline{h}_{T \cdot K}$ may be estimated as follows:

$$\sigma_x \cdot \hat{h}_{r,t,v}(l) = LPF_{channel}\left(\frac{1}{N_P \cdot \sqrt{E_{cp}/\sigma_x^2}} \cdot \sum_{k=0}^{N_P-1} p_t^*(k+l) \cdot y_{r,v}(k)\right),$$ Eq (20)

where $\hat{h}_{r,t,v}(l)$ is an estimate of channel gain $h_{r,t,v}(l)$. Channel gain estimates may be obtained for r=1, . . . , R, t=1, . . . , T, v=1, . . . , V, and l=0, . . . , L−1. Equation (20) is equivalent to equation (15). However, $\hat{h}_{r,t,v}(l)$ may be computed for different values of r, t, v and l with equation (20) whereas $\hat{\underline{h}}_{t,D}$ may be computed for different values of t and a specific value of D with equation (15). The channel gain estimates $\hat{h}_{r,t,v}(l)$ may be used to form $\hat{\underline{h}}_i$, which is an estimate of $\underline{h}_i$, for i=1, . . . , T·K For the second scheme, the background noise may be assumed to be spatio-temporally white, so that $\underline{R}_n = \sigma_n^2 \cdot \underline{I}$, where $\sigma_n^2$ the noise variance and $\underline{I}$ is an identity matrix. The noise variance may be estimated as follows:

$$\hat{\sigma}_n^2 = \hat{I}_o - \hat{I}_{or},$$ Eq (21)

where $\hat{I}_o$ is the estimated total received energy, and
$\hat{I}_{or}$ is the estimated signal and interference energy.
In an embodiment, $\hat{I}_o$ and $\hat{I}_{or}$ may be derived as follows:

$$\hat{I}_o = LPF_{noise}\left(\frac{1}{R \cdot P} \cdot \sum_{r=1}^{R} \sum_{v=1}^{V} |y_{r,v}(k)|^2\right), \text{ and}$$ Eq (22)

$$\hat{I}_{or} = LPF_{noise}\left(\frac{1}{R \cdot P} \cdot \sum_{r=1}^{R} \sum_{t=1}^{T} \sum_{v=1}^{V} \sum_{l=0}^{L-1} |\hat{h}_{r,t,v}(l)|^2\right).$$ Eq (23)

In another embodiment, $\hat{I}_{or}$ may be derived by summing channel gains with sufficient energy. A channel gain may be considered to be sufficiently strong if, e.g., $|\hat{h}_{r,t,v}(l)|^2 \geq E_{th}$, where $E_{th}$ is a threshold. $E_{th}$ may be a fixed value or a configurable value that may be derived based on the total energy for all channel gains.

The noise covariance matrix may then be estimated as follows:

$$\hat{R}_n = \hat{\sigma}_n^2 \cdot I, \quad \text{Eq (24)}$$

where $\hat{R}_n$ is an estimate of $R_n$. $\hat{R}_n$ and $\hat{h}_i$ may be used to derive $w_t$ as shown in equation (13) or $\tilde{w}_t$ as shown in equation (14).

Figure 6:
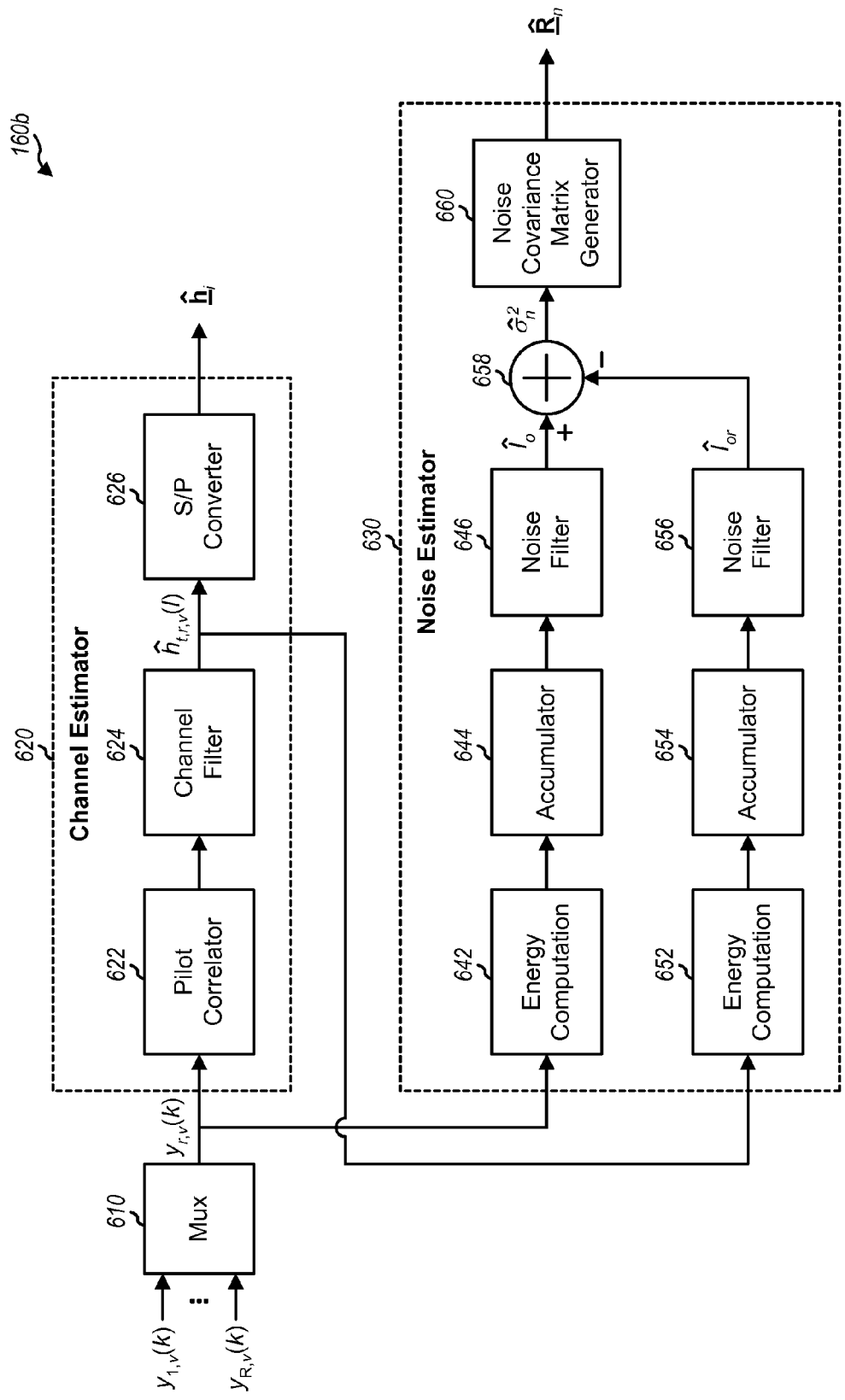
FIG. 6 shows a channel and noise estimator for a second scheme.

FIG. 6 shows a block diagram of a channel and noise estimator 160b, which implements the second channel and noise estimation scheme and is another embodiment of channel and noise estimator 160 in FIG. 1. Estimator 160b includes a multiplexer (Mux) 610, a channel estimator 620, and a noise estimator 630. Multiplexer 610 receives the samples from R receiver units 154a through 154r and provides a stream of samples $y_{r,v}(k)$ in a desired order.

Within channel estimator 620, a pilot correlator 622 correlates $y_{r,v}(k)$ with a pilot sequence $p_t(k)$ for each transmit antenna and provides initial channel gain estimates for all transmit antennas. A channel filter 624 filters the initial channel gain estimates and provides final channel gain estimates, $\hat{h}_{t,r,v}(l)$. Pilot correlator 622 and filter 624 perform the processing shown in equation (20). An S/P converter 626 receives the final channel gain estimates for all transmit antennas and provides channel response vectors $\hat{h}_i$, for $i=1, \ldots, T \cdot K$.

Noise estimator 630 estimates the total received energy $I_o$, the signal and interference energy $I_{or}$, and the noise $\sigma_n^2$. For the $I_o$ estimate, an energy computation unit 642 computes the energy of each sample as $|y_{r,v}(k)|^2$. An accumulator 644 accumulates the sample energies across the V sample periods and the R receive antennas and provides an initial $I_o$ estimate for each chip period. A noise filter 646 filters the initial $I_o$ estimates and provides the final $I_o$ estimate, $\hat{I}_o$. For the $I_{or}$ estimate, an energy computation unit 652 computes the energy of each channel tap as $|\hat{h}_{t,r,v}(l)|^2$. An accumulator 654 accumulates the channel tap energies across the V sample periods, the L channel taps, the T transmit antennas, and the R receive antennas and provides an initial $I_{or}$ estimate. The accumulation may also be performed over channel taps with sufficient energy. A noise filter 656 filters the initial $I_{or}$ estimates and provides the final $I_{or}$ estimate, $\hat{I}_{or}$. For the $\sigma_n^2$ estimate, a summer 658 subtracts $\hat{I}_{or}$ from $\hat{I}_o$ and provides the noise variance estimate, $\hat{\sigma}_n^2$. A unit 660 forms a noise covariance matrix $\hat{R}_n$ based on $\hat{\sigma}_n^2$, as shown in equation (24). The scaling factors in equations (20), (22) and (23) may be accounted for in various units, e.g., in filters 624, 646 and 656.

Figure 7:
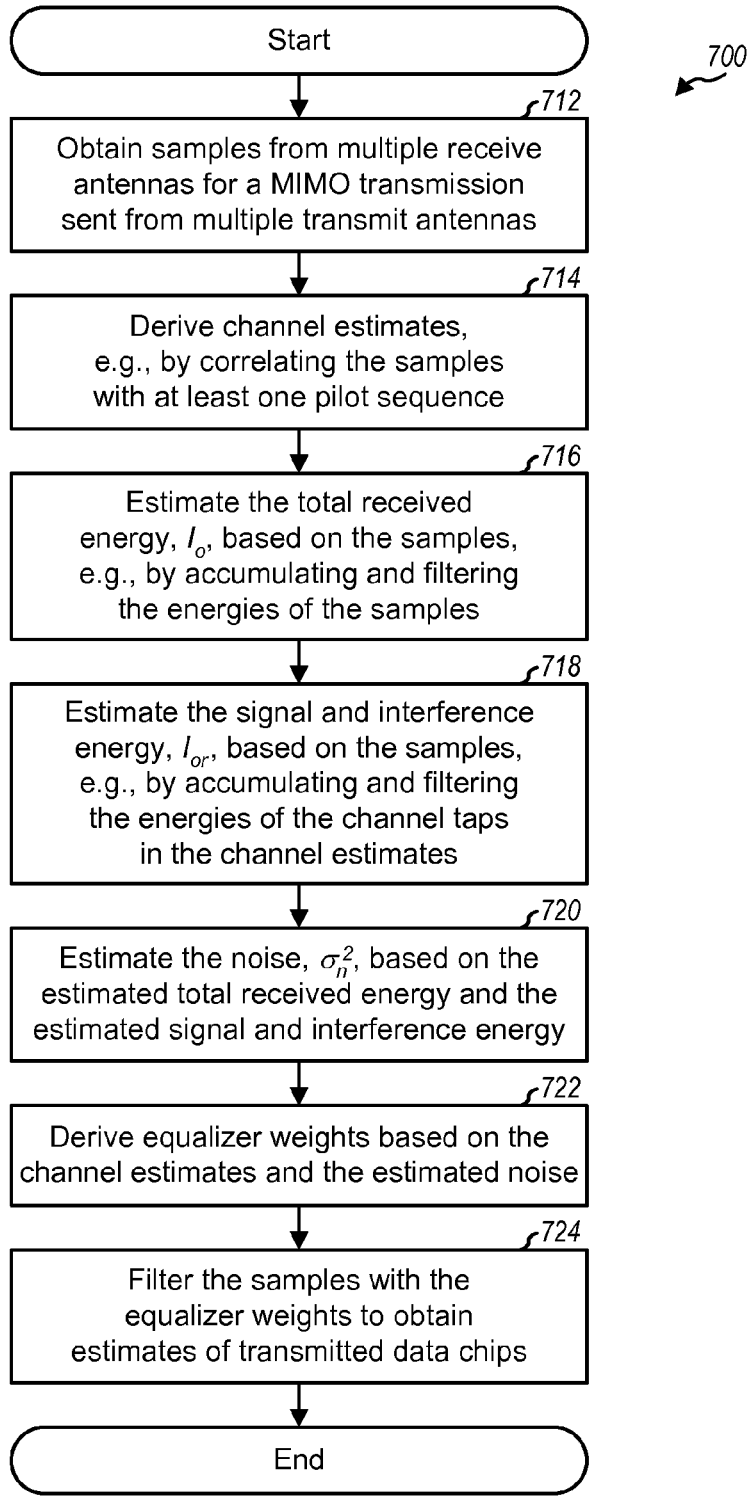
FIG. 7 shows a process for the second channel and noise estimation scheme.

FIG. 7 shows an embodiment of a process 700 for performing channel and noise estimation based on the second scheme. Samples are obtained from multiple receive antennas for a MIMO transmission sent from multiple transmit antennas (block 712). Channel estimates are derived, e.g., by correlating the samples with at least one pilot sequence (block 714). The total received energy $I_o$ is estimated based on the samples, e.g., by computing the energy of each sample, accumulating the sample energies across the receive antennas and for a given time interval, and filtering the accumulated results for different time intervals (block 716). The signal and interference energy $I_{or}$ is estimated based on the samples, e.g., by computing the energy of each channel tap in the channel estimate, accumulating the energies of all or sufficiently strong channel taps for a given time interval, and filtering the accumulated results for different time intervals (block 718). The channel estimates may be derived with a first filter having a first bandwidth. The total received energy as well as the signal and interference energy may be estimated with a second filter having a second bandwidth that may be the same or different from the first bandwidth. The noise $\sigma_n^2$ is estimated based on the estimated total received energy and the estimated signal and interference energy (block 720). Equalizer weights are derived based on the channel estimates and the estimated noise (block 722). The samples are filtered with the equalizer weights to obtain estimates of the data chips sent from the transmit antennas (block 724).

The second scheme can provide good performance for operating scenarios in which the background noise is spatio-temporally white. The second scheme also works well for a severe multipath environment since (a) the background noise $R_n$ is less significant and (b) the dominant component of $R_{yy}$ is likely to be multipath interference that may be accurately estimated based on the channel estimates obtained from equation (20).

In a third channel and noise estimation scheme, $R_{yy}$ is decomposed into on-time components and remaining components, which are estimated separately. For the third scheme, initial channel estimates may be derived as follows:

$$\underline{h}'_{t,D}(j) = \sum_{k=jN_P-D}^{(j+1)\cdot N_P-D-1} p_t^*(k+D) \cdot \underline{y}(k), \quad \text{Eq (25)}$$

where $\underline{h}_{t,D}'(j)$ is an estimate of $\underline{h}_{t,D}$ for pilot symbol period j.

The channel response vectors may then be estimated as follows:

$$\hat{\underline{h}}_{t,D} = LPF_{channel}\left(\frac{1}{N_P \cdot \sqrt{E_{cp}/\sigma_x^2}} \cdot \underline{h}'_{t,D}(j)\right). \quad \text{Eq (26)}$$

Equations (25) and (26) are equivalent to equation (15).

Equations (13) and (14) for the equalizer weights may be rewritten as follows:

$$\underline{w}_t^H = \sigma_x \cdot \underline{h}_{t,D}^H \cdot \underline{R}_{yy}^{-1} \quad \text{Eq (27)}$$
$$= \sigma_x \cdot \underline{h}_{t,D}^H \cdot [\underline{R}_{ot} + \underline{R}_c]^{-1}$$

and $$\underline{\tilde{w}}_t^H = G \cdot \sigma_x \cdot \underline{h}_{t,D}^H \cdot \underline{\tilde{R}}_{yy}^{-1} \quad \text{Eq (28)}$$
$$= G \cdot \sigma_x \cdot \underline{h}_{t,D}^H \cdot [G^2 \cdot \underline{R}_{ot} + \underline{R}_c]^{-1}$$

where $\underline{R}_{ot}$ is a matrix indicative of signal and on-time interference statistics, and $\underline{R}_c$ is a matrix indicative of noise and multipath interference statistics.

$\underline{R}_{ot}$ may be expressed as:

$$\underline{R}_{ot} = \sum_{i=1}^{T} \sigma_x^2 \cdot \underline{h}_{i,D} \cdot \underline{h}_{i,D}^H. \quad \text{Eq (29)}$$

$\underline{R}_{ot}$ includes the desired signal as well as the on-time interference from the other transmit antennas.

$R_c$ may be expressed as:

$$R_c = \sum_{q \in Q} \sigma_x^2 \cdot h_q \cdot h_q^H + R_n, \qquad \text{Eq (30)}$$

where Q is a set that includes 1 through T·K but excludes (i−1)·K+D, for i=1, . . . , T. $R_c$ includes (1) multipath interference, which is interference that is not on-time and represented by the summation in equation (30), and (2) background noise, which is represented by $R_n$. $R_c$ does not include contribution from the signal and on-time interference, which is represented by $\hat{h}_{t,D}$. Hence, $R_c$ may be estimated by performing differential-based multipath plus noise estimation.

To estimate $R_c$, $h_{t,D}'(j)$ is first differentiated as follows:

$$\Delta h_{t,D}(j) = \frac{1}{\sqrt{2N_P}} \cdot [h_{t,D}'(j) - h_{t,D}'(j-1)]. \qquad \text{Eq (31)}$$

The differential operation in equation (31) cancels the on-time components in $h_{t,D}'(j)$ if the channel response remains constant over two consecutive pilot symbol periods. A scaling factor of $1/\sqrt{2}$ is introduced in equation (31) so that the differential operation does not change the second-order moment of the multipath interference and the background noise. An estimate of $R_c$ may then be derived as follows:

$$\hat{R}_c = LPF_{noise}\left(\frac{1}{T} \cdot \sum_{t=1}^{T} \Delta h_{t,D}(j) \cdot \Delta h_{t,D}^H(j)\right). \qquad \text{Eq (32)}$$

$\hat{R}_c$ does not include contributions from the on-time components, which are removed by the differential operation in equation (31).

An estimate of $R_{ot}$ may be derived as follows:

$$\hat{R}_{ot} = \sum_{t=1}^{T} \hat{h}_{t,D} \cdot \hat{h}_{t,D}^H. \qquad \text{Eq (33)}$$

For the weight vectors shown in equation (13) and (27), $\hat{R}_c$ may be augmented with $\hat{R}_{ot}$ to obtain an estimate of $R_{yy}$, as follows:

$$\hat{R}_{yy} = \hat{R}_{ot} + \hat{R}_c. \qquad \text{Eq (34)}$$

The weight vectors may then be derived as:

$$\hat{w}_t^H = \hat{h}_{t,D}^H \cdot \hat{R}_{yy}^{-1}. \qquad \text{Eq (35)}$$

For the enhanced weight vectors shown in equation (14) and (28), $\hat{R}_c$ may be augmented with $\hat{R}_{ot}$ to obtain an estimate of $\tilde{R}_{yy}$, as follows:

$$\tilde{\hat{R}}_{yy} = G^2 \cdot \hat{R}_{ot} + \hat{R}_c. \qquad \text{Eq (36)}$$

The enhanced weight vectors may then be derived as:

$$\tilde{\hat{w}}_t^H = \hat{h}_{t,D}^H \cdot \tilde{\hat{R}}_{yy}^{-1}. \qquad \text{Eq (37)}$$

Figure 8:
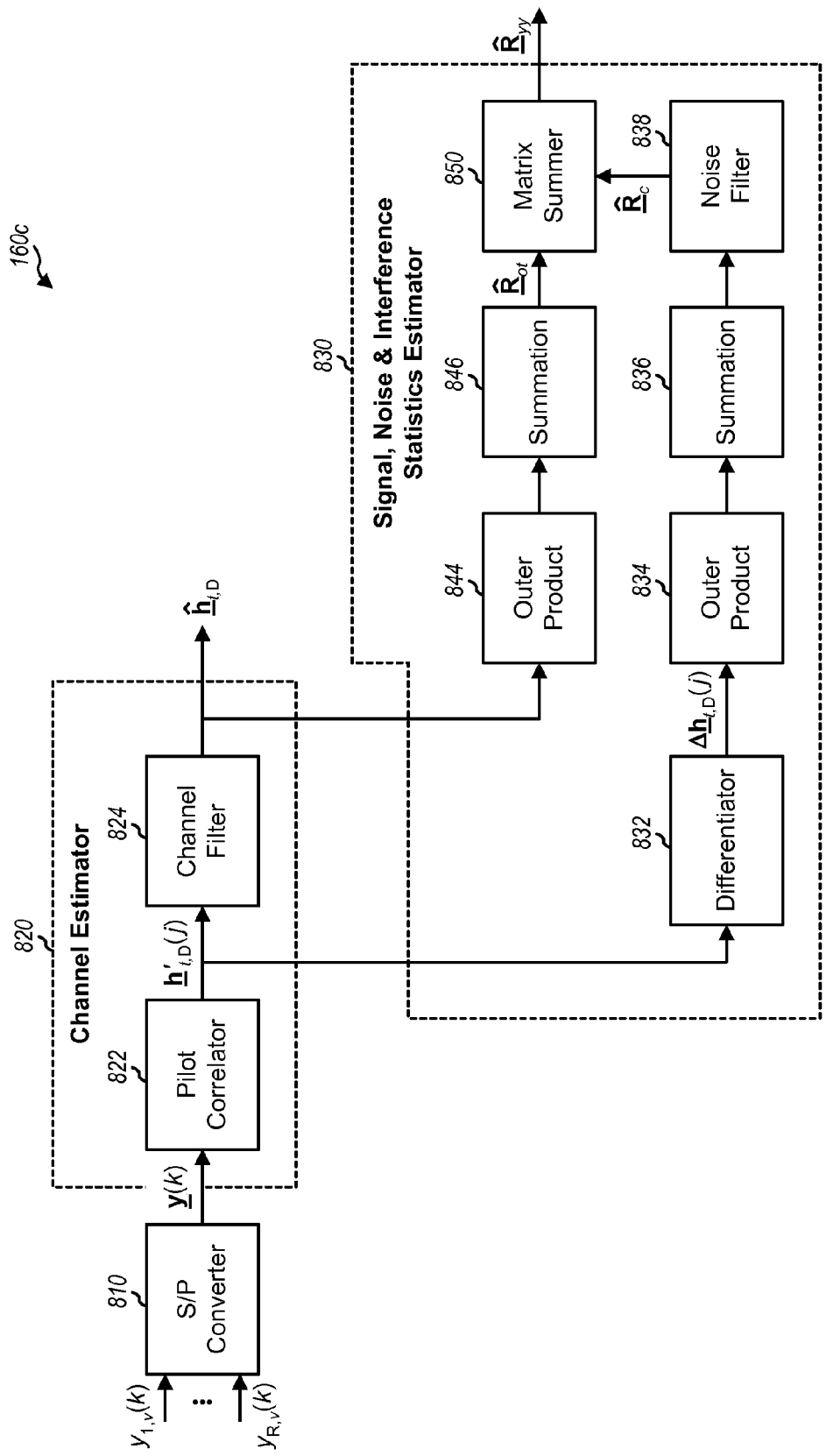
FIG. 8 shows a channel and noise estimator for a third scheme.

FIG. 8 shows a block diagram of a channel and noise estimator 160c, which implements the third channel and noise estimation scheme and is yet another embodiment of channel and noise estimator 160 in FIG. 1. Estimator 160c includes an S/P converter 810, a channel estimator 820, and a signal, noise and interference statistics estimator 830. S/P converter 810 receives the samples from R receiver units 154a through 154r and forms vector y(k).

Within channel estimator 820, a pilot correlator 822 correlates y(k) with a pilot sequence $p_t(k)$ for each transmit antenna t and provides an initial channel estimate, $h_{t,D}'(j)$ for each transmit antenna in each pilot symbol period j. A channel filter 824 filters the initial channel estimates and provides final channel estimates, $\hat{h}_{t,D}$. Pilot correlator 822 performs the processing shown in equation (25). Filter 824 performs the processing shown in equation (26).

Within estimator 830, a unit 832 receives and differentiates the initial channel estimates, $h_{t,D}'(j)$, as shown in equation (31) and provides the difference, $\Delta h_{t,D}(j)$. A unit 834 computes the outer product of $\Delta h_{t,D}(j)$. A unit 836 sums the output of unit 834 across all T transmit antennas. A noise filter 838 filters the output from unit 836 and provides the estimated noise and multipath interference statistics, $\hat{R}_c$. Units 834, 836 and 838 perform the processing shown in equation (32). A unit 844 computes the outer product of $\hat{h}_{t,D}$. A unit 846 sums the output of unit 844 across all T transmit antennas and provides the estimated signal and on-time interference statistics, $\hat{R}_{ot}$. Units 844 and 846 perform the processing shown in equation (33). A matrix summer 850 sums $\hat{R}_c$ with $\hat{R}_{ot}$ and provides the estimated signal, noise and interference statistics, $\hat{R}_{yy}$. The scaling factors in equations (26), (31) and (32) may be accounted for in various units, e.g., in filters 824 and 838.

$R_c$ and $R_{ot}$ may also be estimated in other manners. For example, an estimate of $R_{ot}$ may be obtained by computing the outer product of $h_{t,D}'(j)$, summing across T transmit antennas, and filtering the summed results. As another example, an estimate of $R_c$ may be obtained by filtering $\Delta h_{t,D}(j)$, computing the outer product of the filtered $\Delta h_{t,D}(j)$, and summing across the T transmit antennas.

Figure 9:
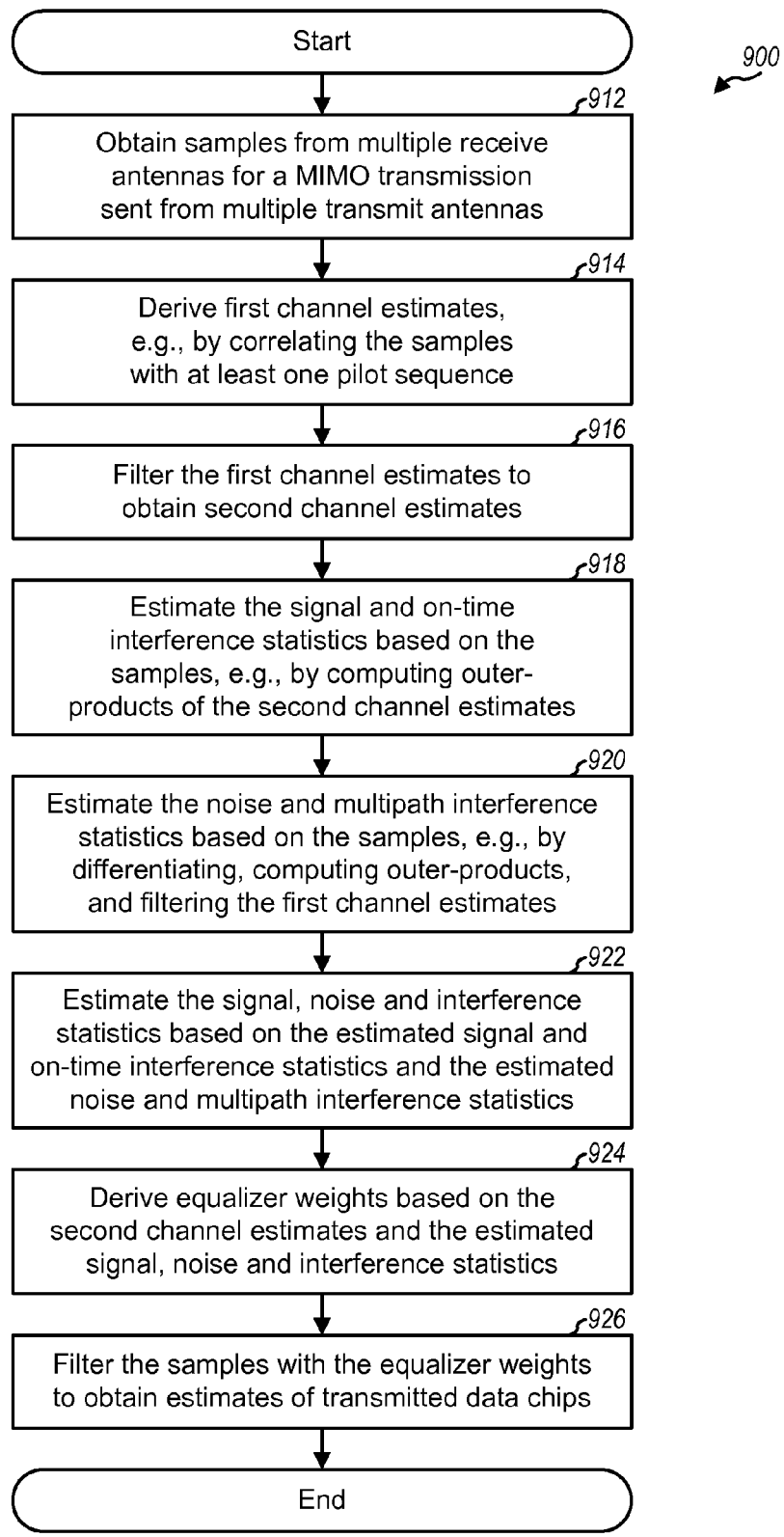
FIG. 9 shows a process for the third channel and noise estimation scheme.

FIG. 9 shows an embodiment of a process 900 for performing channel and noise estimation based on the third scheme. Samples are obtained from multiple receive antennas for a MIMO transmission sent from multiple transmit antennas (block 912). First or initial channel estimates may be derived, e.g., by correlating the samples with at least one pilot sequence (block 914). The first channel estimates are filtered with a first filter to obtain second or final channel estimates (block 916).

The signal and on-time interference statistics are estimated based on the samples, e.g., by computing the cross-product of the second channel estimates and summing across the transmit antennas (block 918). The noise and multipath interference statistics are also estimated based on the samples, e.g., by differentiating the first channel estimates, computing cross-product of the differentiated results, and filtering the cross-product results with a second filter (block 920). The first and second filters may have the same or different bandwidths, which may be fixed or configurable, e.g., adjusted based on channel conditions. The signal, noise and interference statistics are then estimated based on the estimated signal and on-time interference statistics and the estimated noise and multipath interference statistics (block 922).

Equalizer weights are derived based on the second channel estimates and the estimated signal, noise and interference statistics (block 924). The samples are filtered with the equalizer weights to obtain estimates of the data chips sent from the transmit antennas (block 926).

As shown in equation (26), the on-time components at delay D may be averaged by the channel filter, $LPF_{channel}$, to obtain $\hat{h}_{t,D}$, which is used to derive $\hat{R}_{ot}$. The background noise and multipath interference may be averaged by the noise filter, $LPF_{noise}$, to obtain $\hat{R}_c$. The use of two filters to average the desired signal in $\hat{h}_{t,D}$ and the noise and multipath interference in $\hat{R}_c$ may be beneficial in some environments. For example, in a single-path high-velocity channel, a small bandwidth or large time constant may be used for the noise filter to improve the accuracy of $\hat{R}_c$, and a large bandwidth or small time constant may be used for the channel filter to prevent utilization of stale or obsolete channel estimates $\hat{h}_{t,D}$. The noise and multipath interference estimation is typically more accurate with a smaller bandwidth for the noise filter. A smaller noise filter bandwidth is beneficial for a severe multipath channel in order to sufficiently suppress large uncorrelated components associated with multipath. However, the bandwidth of the noise filter should not be reduced too much in a severe multipath high-velocity channel since multipath component becomes the dominant component that determines $\hat{R}_c$, and the multipath component may become outdated if the noise filter bandwidth is too small.

The third scheme provides good performance for many channel environments, especially for a single-path high geometry channel. The use of the robust differential-based noise estimation allows the third scheme to work well in various channel conditions. The third scheme also has lower computational complexity than the first scheme since the outer products in equations (32) and (33) are performed every pilot symbol period instead of every chip period. The third scheme also provides good performance even with a colored background noise.

For the third scheme, the differential operation in equation (31) assumes that the channel is constant over two consecutive pilot symbol periods. A sufficiently short pilot symbol duration may be used for a high-velocity channel so that the noise and multipath interference estimation is not outdated. Computer simulation results show that a pilot symbol duration of 256 chips or less for HSDPA in W-CDMA provides good performance with 30 km/h velocity.

In general, the estimation of the multipath interference in $R_c$ may be improved with more vectors for $h_{t,D}'(j)$. The number of $h_{t,D}'(j)$ vectors may be increased by taking partial integration of the pilot symbols. For example, if the pilot symbol duration is 512 chips long, then the integration length may be set to 128 chips, and four $h_{t,D}'(j)$ vectors may be obtained per pilot symbol. The partial integration may result in crosstalk between orthogonal pilots from different transmit antennas. However, since the orthogonal pilot patterns and the channel estimates $\hat{h}_{t,D}$ are known, the pilot crosstalk may be estimated and subtracted out. This approach may still suffer from the leakage (crosstalk) of some OCNS channels if they have a symbol length greater than 128, but it can be acceptable if the power of the corresponding OCNS is small. Alternatively, in order to maximize the performance, we may take the length of pilot symbols shorter than that of some OCNS symbols in the system design.

In a fourth channel and noise estimation scheme, multiple estimation schemes are supported, and one estimation scheme is selected for use based on channel conditions. In an embodiment, the second scheme is selected for a severe multi-path high-velocity channel and the third scheme is selected for a single-path high-geometry channel. Other combinations of channel and noise estimation schemes may also be used.

The channel conditions may be detected in various manners and with various metrics. In an embodiment, the channel conditions are characterized by delay spread. For this embodiment, a searcher may search for signal paths or multipaths, e.g., similar to the search performed for a CDMA receiver. The delay spread may be computed as the difference between the earliest and latest arriving signal paths at the receiver. In another embodiment, the channel conditions are characterized by a path energy ratio. For this embodiment, the energy of the strongest signal path is computed, and the combined energy of all other signal paths identified as significant (e.g., with energy exceeding a threshold $E_{th}$) is also computed. The path energy ratio is the ratio of the combined energy for the significant paths to the energy for the strongest path. A low path energy ratio may indicate a single path environment whereas a high path energy ratio may indicate a multipath environment. In yet another embodiment, the velocity of the receiver is estimated, e.g., based on an estimate of Doppler and/or some other velocity-indicating parameter.

In an embodiment, the third estimation scheme is selected if the delay spread is smaller than a delay threshold $D_{th}$, or if the path energy ratio is less than a predetermined threshold $P_{th}$ or if the velocity is below a velocity threshold $V_{th}$. The second estimation scheme may be selected otherwise. If the velocity is low, then the bandwidth of the noise filter may be reduced to improve noise estimation. In general, the third estimation scheme may be used if a sufficient number of noise and multipath interference samples that are relatively current can be obtained, e.g., via a short pilot symbol period or small bandwidth for the noise filter. Otherwise, the second estimation scheme may be used.

Figure 10:
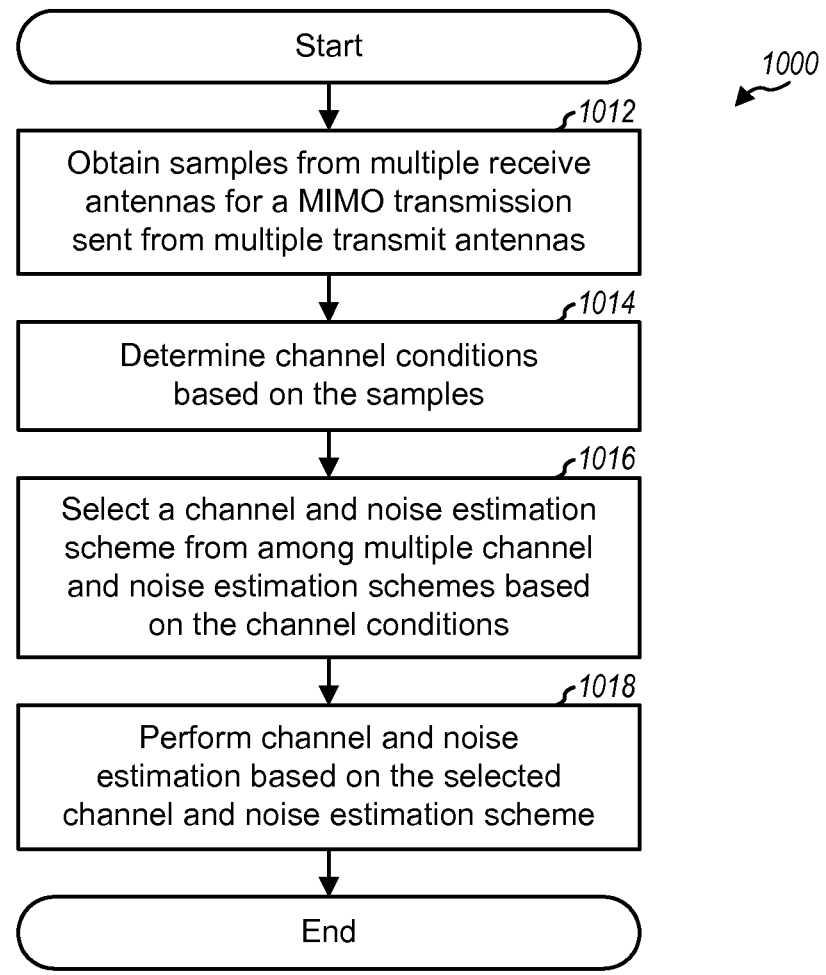
FIG. 10 shows a process for a fourth channel and noise estimation scheme.

FIG. 10 shows an embodiment of a process 1000 for performing channel and noise estimation based on the fourth scheme. Samples are obtained from multiple receive antennas for a MIMO transmission sent from multiple transmit antennas (block 1012). Channel conditions are determined based on the samples (block 1014). The channel conditions may be characterized by (1) delay spread, which may be estimated based on the earliest and latest arriving signal paths, (2) single path or multipath environment, which may be determined based on the energies of the signal paths detected at the receiver, (3) velocity, which may be estimated based on Doppler, and/or (4) possibly other criteria.

A channel and noise estimation scheme is selected from among multiple channel and noise estimation schemes based on the channel conditions (block 1016). The multiple channel and noise estimation schemes may include all or any combination of the schemes described above. For example, the second and third channel and noise estimation schemes described above may be supported. The third channel and noise estimation scheme may be selected if the channel conditions indicate a small delay spread, a single path environment, low velocity, or a combination thereof. The second channel and noise estimation scheme may be selected if the channel conditions indicate a large delay spread, a multipath environment, high velocity, or a combination thereof. Channel and noise estimation is then performed based on the selected channel and noise estimation scheme (block 1018).

The channel and noise estimation techniques described herein may be implemented by various means. For example, these techniques may be implemented in hardware, firmware, software, or a combination thereof. For a hardware implementation, the processing units used to perform channel and noise estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 192 in FIG. 1) and executed by a processor (e.g., processor 190). The memory may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor;
    memory in electronic communication with the processor;
    instructions stored in the memory, the instructions being executable by the processor to:
        obtain samples from multiple receive antennas for a multiple-input multiple-output (MIMO) transmission sent from multiple transmit antennas;
        derive channel estimates by correlating the samples with at least one pilot sequence;
        estimate signal, noise and interference statistics based on a cross product of the samples; and
        derive equalizer weights,
        wherein the correlating comprises multiplying a sample vector for a chip period and a complex conjugated pilot chip for the chip period offset by a delay.

2. The apparatus of claim 1, wherein the instructions executable to derive the channel estimates comprise instructions executable to derive the channel estimates using a first filter having a first bandwidth, and the instructions executable to estimate the signal, noise and interference statistics comprise instructions executable to derive the signal, noise and interference statistics using a second filter having a second bandwidth.

3. The apparatus of claim 1, wherein the instructions executable to derive equalizer weights comprise instructions executable to derive equalizer weights based on the channel estimates and the estimated signal, noise and interference statistics, and to filter the samples with the equalizer weights.

4. The apparatus of claim 1, further comprising instructions executable to transmit multiple signals from the multiple transmit antennas, each signal comprising multiple data streams multiplexed with different orthogonal codes.

5. A method comprising:
    obtaining samples from multiple receive antennas for a multiple-input multiple-output (MIMO) transmission sent from multiple transmit antennas;
    deriving channel estimates by correlating the samples with at least one pilot sequence, wherein the correlating comprises multiplying a sample vector for a chip period and a complex conjugated pilot chip for the chip period offset by a delay;
    estimating signal, noise and interference statistics based on a cross product of the samples; and
    deriving equalizer weights.

6. The method of claim 5, wherein the deriving the channel estimates comprises deriving the channel estimates using a first filter having a first bandwidth, and wherein the estimating the signal, noise and interference statistics comprises estimating the signal, noise and interference statistics using a second filter having a second bandwidth.

7. The method of claim 5, wherein the deriving equalizer weights comprises:
    deriving the equalizer weights based on the channel estimates and the estimated signal, noise and interference statistics; and
    filtering the samples with the equalizer weights.

8. The method of claim 5, further comprising transmitting multiple signals from the multiple transmit antennas, each signal comprising multiple data streams multiplexed with different orthogonal codes.

9. An apparatus comprising:
    means for obtaining samples from multiple receive antennas for a multiple-input multiple-output (MIMO) transmission sent from multiple transmit antennas;
    means for deriving channel estimates by correlating the samples with at least one pilot sequence, wherein the correlating comprises multiplying a sample vector for a chip period and a complex conjugated pilot chip for the chip period offset by a delay;
    means for estimating signal, noise and interference statistics based on a cross product of the samples; and
    means for deriving equalizer weights.

10. The apparatus of claim 9, wherein the means for deriving the channel estimates comprises means for deriving the channel estimates using a first filter having a first bandwidth, and wherein the means for estimating the signal, noise and interference statistics comprises means for estimating the signal, noise and interference statistics using a second filter having a second bandwidth.

11. The apparatus of claim 9, wherein the means for deriving equalizer weights comprises means for deriving equalizer weights based on the channel estimates and the estimated signal, noise and interference statistics and means for filtering the samples with the equalizer weights.

12. The apparatus of claim 9, further comprising means for transmitting multiple signals from the multiple transmit antennas, each signal comprising multiple data streams multiplexed with different orthogonal codes.

13. A non-transitory processor-readable medium, comprising:
    code for obtaining samples from multiple receive antennas for a multiple-input multiple-output (MIMO) transmission sent from multiple transmit antennas;
    code for deriving channel estimates by correlating the samples with at least one pilot sequence, wherein the correlating comprises multiplying a sample vector for a chip period and a complex conjugated pilot chip for the chip period offset by a delay;
    code for estimating signal, noise and interference statistics based on a cross product of the samples; and
    code for deriving equalizer weights.

14. The processor-readable medium of claim 13, wherein the code for deriving the channel estimates comprises code for deriving the channel estimates using a first filter having a first bandwidth, and wherein the code for estimating the signal, noise and interference statistics comprises code for estimating the signal, noise and interference statistics using a second filter having a second bandwidth.

15. The processor-readable medium of claim 13, wherein the code for deriving equalizer weights comprises code for deriving equalizer weights based on the channel estimates and the estimated signal, noise and interference statistics, and code for filtering the samples with the equalizer weights.

16. The processor-readable medium of claim 13, further comprising code for transmitting multiple signals from the multiple transmit antennas, each signal comprising multiple data streams multiplexed with different orthogonal codes.

* * * * *